(12) United States Patent
Spackman

(10) Patent No.: US 8,397,028 B2
(45) Date of Patent: Mar. 12, 2013

(54) INDEX ENTRY EVICTION

(76) Inventor: Stephen Spackman, San Jose, CA (US)

( * ) Notice: Subject to any disclaimer, the term of this patent is extended or adjusted under 35 U.S.C. 154(b) by 240 days.

(21) Appl. No.: 12/815,529

(22) Filed: Jun. 15, 2010

(65) Prior Publication Data

US 2011/0307683 A1    Dec. 15, 2011

(51) Int. Cl.
G06F 12/10    (2006.01)
(52) U.S. Cl. ........ 711/135; 711/158; 711/216; 707/753; 707/830
(58) Field of Classification Search .................. 711/216, 711/135, 158; 707/753, 830
See application file for complete search history.

(56) References Cited

U.S. PATENT DOCUMENTS 6,272,598 B1 *  8/2001  Arlitt et al. ..................... 711/133
7,536,512 B2 *  5/2009  Chetuparambil et al. ..... 711/133
7,949,630 B1 *  5/2011  Auchmoody ................. 707/609

* cited by examiner

Primary Examiner — Kalpit Parikh

(57) ABSTRACT

Systems, methods embodied on computer-readable media, and other embodiments associated with index entry eviction are described. One example method includes selecting an index entry for eviction from a bucket of index entries based on a time value, a utility value, and a precedence value. A precedence value may be a value associated with an index entry that is static over time. Additionally, results of a function that compares two precedence values may be static over time. The example method may also include providing an index entry identifier that identifies the index entry.

15 Claims, 7 Drawing Sheets

Deduplication Index 600

Hash Bucket Table 700

INDEX ENTRY EVICTION

BACKGROUND

Some companies rely on data deduplication techniques to reduce certain costs associated with data. For example, in some instances a user may desire to store a copy of a file to a second location on their computer. Conventionally, this may cause a second copy of the file to be created and stored on the user's computer. Instead of storing the file twice, a reference may be stored pointing to the original file, thereby reducing the amount of data stored on the computer. Additionally, some computers may be able to reduce bandwidth usage using data deduplication techniques. If a file that a computer has been instructed to acquire from an external device already exists on the computer, the computer may determine that it does not need to download a new copy of the file. While files are described, some conventional data deduplication systems typically operate on less than file sized chunks of data.

Conventional data deduplication logics sometimes rely on hashes of blocks of data to distinguish blocks of data instead of directly comparing entire blocks of data. Some conventional hashing algorithms ensure that it is very uncommon for two blocks of data to hash to the same value. For example, a 128 bit hash could map blocks of data to up to $2^{128}$ or over $3.4 \times 10^{38}$ different values. This may allow a data deduplication logic to index a large number of blocks of data using hashes without having to worry about collisions. In the above 128 bit hash example, depending on the hashing algorithm, a collision where two blocks of data have hashed to the same value is about 50% likely to have occurred once $2.2*10^{19}$ different blocks have data have been hashed. This means that when hashes for two different blocks of data match, it is very likely that the two blocks of data contain the same data.

To match hashes to actual blocks of data in memory, some conventional data deduplication techniques employ an index to point from hashes to locations in memory that contain blocks of data from which the hashes were generated. Depending on the number of blocks of data that have been indexed, the index may be very large. In some cases the index may be stored on the same local storage device (e.g., a hard disk) as indexed data. However, data stored in a computer's local storage device takes longer to retrieve than data stored in the computer's random access memory (RAM). This makes accessing the index a relatively slow operation. However, because RAMs typically store much less data than a local storage device, it is sometimes difficult to store the entire index in RAM. This may result in scalability, processing, and retention limitations when some data deduplication techniques are employed using a limited amount of RAM.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
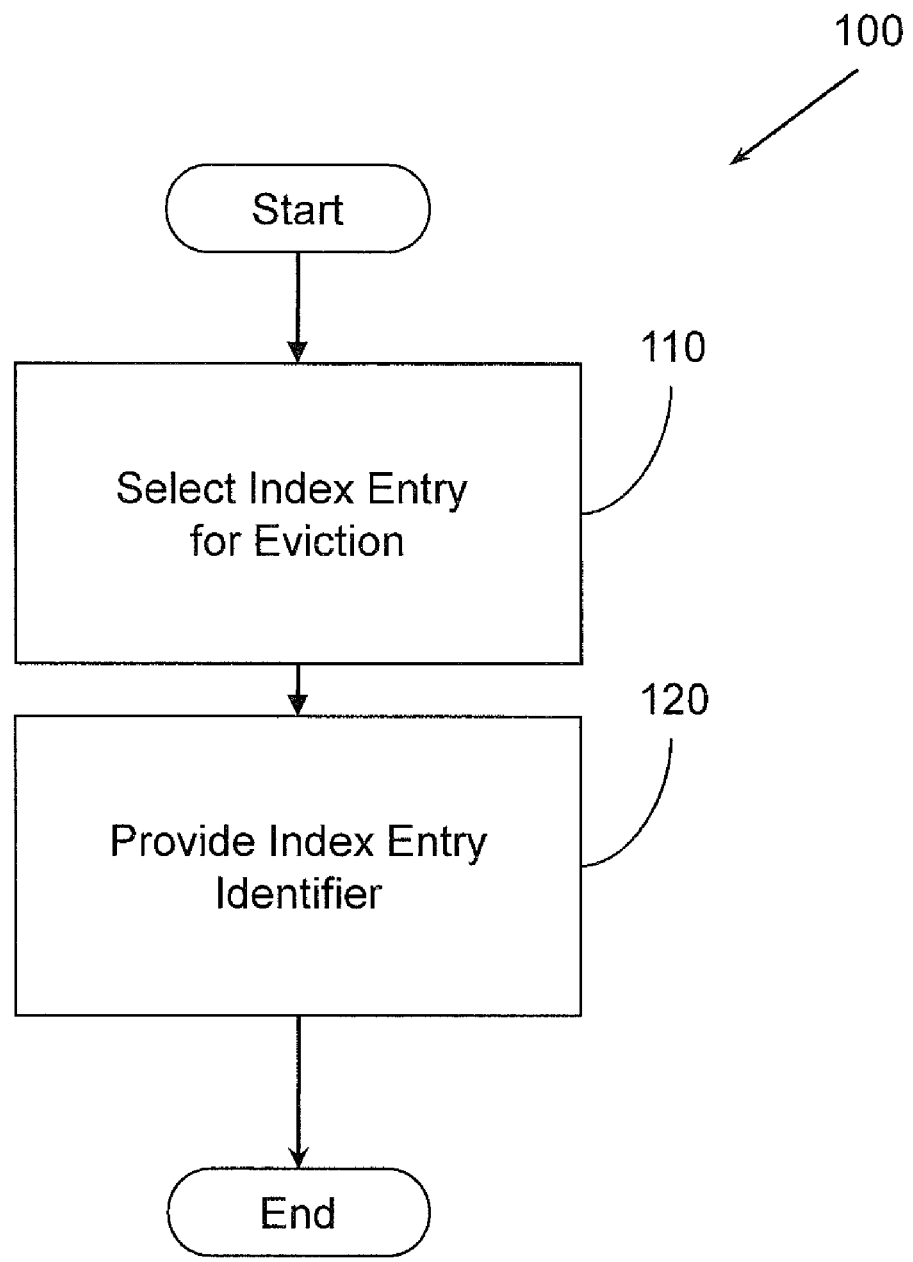
FIG. 1 illustrates an example method associated with index entry eviction.

Systems and computer-readable media associated with index entry eviction are claimed and described. One example method embodied on a computer-readable medium includes selecting an index entry for eviction from a bucket of index entries. The index entry may be selected as a function of a time value, a utility value, and a precedence value. The method may also include providing an identifier that identifies the index entry. The bucket of index entries may be a bucket of a hash-bucket table stored in RAM. The hash bucket table may contain a portion of a data deduplication index that is stored on a memory device that takes longer to access than the RAM.

The time value may describe a time at which the index entry was recently accessed. The time value may also describe a time at which the index entry was created. In one example, the time value may be derived from an ordering implied by the way index entries are stored in the bucket of index entries. The utility value may describe the number of times the index entry resolves an index lookup. The number of times the index entry resolves an index lookup may include times when the index entry resolves an index lookup for a related (e.g., spatial, temporal) index entry. The precedence value may be a value generated based on a hash of data identified by the index entry. Because the index entry identifies the data in memory using a hash of the data to begin with, the precedence value may be based on this hash value. While many different precedence values may be used, the precedence value should be a stable and repeatable value that does not change over time. This means that an index entry should have the same precedence value over time and that choosing between two precedence values multiple times should always result in the same choice. One example precedence value is the numerical value of the hash or a consistently chosen portion of the hash. Thus a 4 bit hash of 0010 would have a numerical value of 2 and a 4 bit hash of 1101 would have a numerical value of 13. Thus, because the numerical value of a hash does not change over time, and because one of two different integers is always greater than the other, numerical values make good precedence values.

Using a stable and repeatable precedence value when favoring storage of index entries may facilitate faster processing of index lookups. For example, favoring retaining index entries having a high numerical hash value will result in buckets that are likely to contain index entries with high numerical hash values. A deduplication logic may then be configured to favor processing high numerical value hashes when there is a number of pending index lookups. This may make it more likely for index hits to be found in the hash bucket table. Furthermore, because groups of index lookups sometimes occur in reoccurring sequences, when there is a successful lookup for a high numerical hash value entry, the deduplication logic may be able to cache index entries that are related to the high numerical hash value index entry. This may result in more successful lookups that do not go to the full index on the slower device at the time they are processed.

Figure 5:
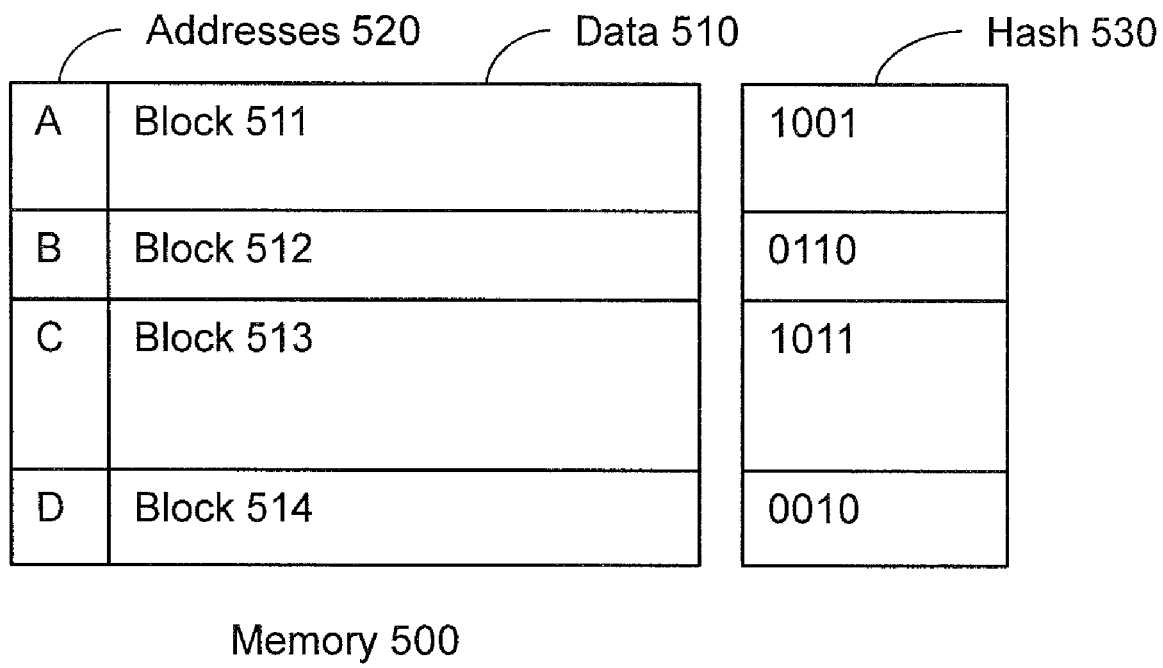
FIG. 5 illustrates example data in memory with which example systems and methods, and equivalents, may interact.

Consider memory 500 illustrated in FIG. 5. The memory 500 stores data blocks 510. The data is divided up into blocks 511-514. The blocks 510 may be different sizes and may not be stored consecutively. The blocks of data 510 are associated with memory addresses 520. A memory address may denote a location in memory at which a block 510 of data begins. Thus, block 511 is associated with address A, block 512 is associated with address B, block 513 is associated with address C, and block 514 is associated with address D. In this example, the data in the blocks 510 of memory also map to different 4 bit hash values. Block 511 maps to the hash value 1001, block 512 maps to the hash value 0110, block 513 maps to the hash value 1011, and block 514 maps to the hash value 0010. A person having ordinary skill in the art will recognize that the 4 bit hashing scheme is used for illustrative purposes, and may not be appropriate for actual implementation due in part to collision likelihood.

Figure 6:
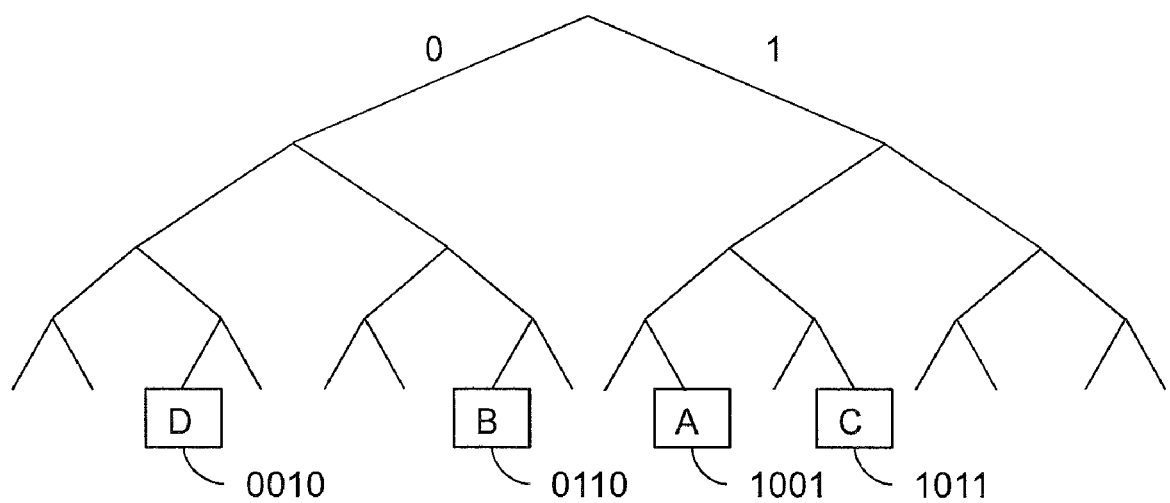
FIG. 6 illustrates an example deduplication index with which example systems and methods, and equivalents, may interact.

FIG. 6 illustrates an example data deduplication index 600. The data deduplication index 600 is represented by a tree data structure, though other representations and implementations (e.g., an array) may be appropriate. In this example, the process of traversing the tree may be the process by which a hash is searched for in the index itself. When a bit of a hash is read as a 0, a searching logic may traverse to the left child of a node. When the bit of a hash is read as a 1, a searching logic may traverse to the right child of the node. For example, the hash 0010 traverses the tree to the left, left, right, and left to the leaf labeled 0010 in the tree. Once a leaf is reached by traversing to the bottom of the tree, if an address is found to be associated with the leaf, then a block of data having a hash represented by the path to the leaf exists and can be accessed by reading memory beginning from the address. By way of illustration, the addresses associated with blocks of data from memory 500 (FIG. 5) are identified in the data deduplication index at the appropriate leaves. If an address is not found, then no matching block of data has been hashed into the data deduplication index.

Figure 7:
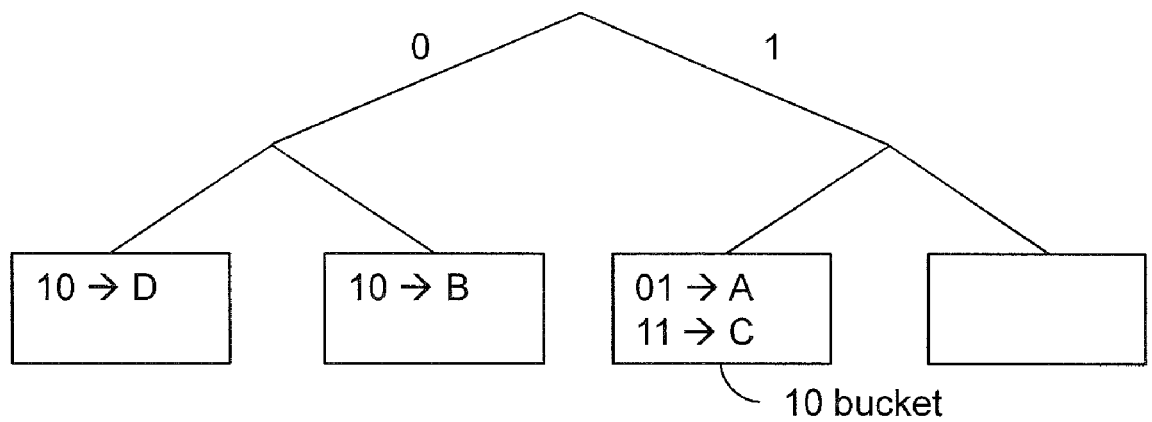
FIG. 7 illustrates an example hash bucket table with which example systems and methods, and equivalents, may interact.

In some systems, it is likely that blocks of data that have been recently accessed and blocks that are accessed on a regular basis will be accessed again in the near future. Thus, an access speed improvement may be achieved by storing in memory a portion of the data deduplication index that identifies blocks of memory that are more likely to be accessed. The memory may be, for example, a RAM. In one example, a hash bucket table 700 as depicted in FIG. 7 may be used to store the portion of the data deduplication index on the RAM. The hash bucket table 700 may be initially structured as the tree structured deduplication index 600 (FIG. 6) with buckets at a certain depth of the tree. The buckets may be able to contain a fixed number of index entries. By way of illustration, address D that points to memory block 514 (FIG. 5) is represented by traversing the tree for two bits (to the left then to the right), and then reading the remainder of the hash from a bucket in memory.

For the purposes of this example, the buckets depicted in hash bucket table 700 hold two entries. Thus, the 10 bucket is full and if a logic wanted to place a different entry in the 10 bucket, then one of the two entries already in the bucket would have to be replaced. To select which of the two entries may be the better choice for removal, the entries may include a time value and a utility value. An entry's time value may describe how recently the entry has been accessed. In another example, an entry's time value may describe how recently the entry has been stored in the bucket. As described above, time values may be stored implicitly by, for example, ordering entries in a bucket according to age or recent accesses. An entry's utility value may describe, for example, how many times the entry has been accessed. The utility value may also include information associated with related index entries that have been accessed based on information in the entry. Thus, selecting an entry for eviction may include comparing ranking values for entries generated as a function of time values, utility values, and precedence values associated with the entries. This may increase the likelihood that entries in the bucket are going to be accessed again in the near future, thereby reducing the likelihood that searching for an entry will require a read of the full index on a slower memory device. Typically an entry will be selected for eviction when a new entry is ready to be added to a bucket. However, a person having ordinary skill in the art will appreciate that there may be other circumstances when it may be appropriate to remove entries from a bucket and other methods that do not rely on time, utility, or precedence information.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

A person having ordinary skill in the art will recognize that different memory devices are accessible at different speeds depending on the type of memory device. Thus, when used herein, a memory device that is referred to as a faster or slower memory device is intended to be relative to another memory device. For example, accessing data stored in RAM is faster than data stored in a computer's hard disk. Additionally, in some situations data stored in a computer's hard disk can be accessed faster than data stored on an external device connected to the computer through, for example, a universal serial bus (USB) connection, or a network connection.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

FIG. 1 illustrates a method 100 associated with index entry eviction. At 110, method 100 includes selecting a selected index entry for eviction from a bucket of index entries. The bucket of index entries may be a bucket associated with a hash-bucket data structure that stores a portion of a data deduplication index. The hash-bucket data structure may be stored as an array in random access memory (RAM). The array may be divided into N buckets of size M, N and M being integers.

An index entry in the bucket of index entries may include data representing a portion of a hash value, a memory location, a utility value describing a usefulness of the index entry, a time value describing an age of the index entry, and so on. The memory location may identify a location of a block of data, a group of memory locations that point to related blocks of data, and so on. The portion of the hash value may be a portion of the hash value not traversed in the process of accessing the bucket. However, in some situations it may be appropriate to store the entire hash value in the index entry. The utility value may indicate a number of times the index entry has been used as a primary source of information for confirming the existence of data in a block of memory associated with the memory location. The time value may indicate a date and time at which the index entry was recently accessed. A person having ordinary skill in the art will appreciate that other utility and time information may be employed.

The selected index entry may be selected as a function of a time value, a utility value, and a precedence value. For example, ranking values may be generated for index entries in the bucket of index entries. A ranking value may be generated for an index entry as a function of the index entry's time value and the index entry's precedence value when the index entry has not yet been accessed by an index lookup. The ranking value may be generated for an index entry as a function of the index entry's time value, the index entry's utility value, and the index entry's precedence value when the index entry has been accessed by an index lookup. The precedence value may be generated as a function of the index entry's portion of a hash value. The precedence value may be generated based on some other factor, and in some situations may be a value stored in the index entry. The precedence value may be the numerical value of the portion of the hash value. Index entries in the bucket of index entries may be ranked according to these ranking values. The index entry having the lowest rank may then be designated as the selected index entry. While selecting based on a ranking value may be one way to handle index entry selection, a person having ordinary skill in the art will recognize other ways to select the selected index entry.

At 120, method 100 includes providing an index entry identifier that identifies the selected index entry. The index entry identifier may be provided to a data deduplication logic. The index entry identifier may control the deduplication logic to replace the selected index entry with a new index entry. In some circumstances, the deduplication logic may also acquire related index entries associated with blocks of memory that are related to the new index entry. These related index entries may also be stored in the hash bucket table. However, a person having ordinary skill in the art will appreciate that the related index entries may be stored in a different location. Acquiring related index entries may speed up handling data deduplication for a number of blocks of memory that are physically or temporally related. Blocks of memory may be physically related if, for example, the blocks are nearby each other in memory or a part of the same file. Blocks of memory may be temporally related if, for example, requests for the blocks of memory are seen together in a sequence. Thus, a utility value for an index entry may also account for index lookups that are indirectly resolved by an index entry. An index lookup is indirectly resolved by an index entry when an index lookup uses a related index entry.

By way of illustration, a computer managing a deduplication index may have been running for a long period of time. At this point at least one of the buckets in a hash bucket table in RAM may be full. Some of the entries in this bucket may have been recently added and some of them may have been used repeatedly, thereby increasing utility values associated with these entries. Therefore, the computer may use method 100 to select one of the entries to evict if the computer determines that a different entry needs to be added to the full bucket. The computer may assign weights to recently added entries according to precedence values and creation times. The computer may assign weights to the entries in the bucket that have been used repeatedly according to their most recent access times, and their utilities.

By way of illustration, a peer to peer application may identify in an index blocks of files that have been downloaded. The index may be stored on a computer's hard disk. When the peer to peer application is initiated, the application may load a portion of the index to RAM. The portion may contain blocks of files that have been recently requested by a user of the computer. If the application is shut down, the portion may be stored so that when the application is re-initiated, the application can quickly determine which blocks of files have already been acquired. However, if a new file is added, the application may use method 100 to determine which entries in the portion have become stale and are no longer efficient to track.

While FIG. 1 illustrates various actions occurring in serial, it is to be appreciated that various actions illustrated in FIG. 1 could occur substantially in parallel. By way of illustration, a first process could select an index entry for eviction and a second process could provide an index entry identifier. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 2:
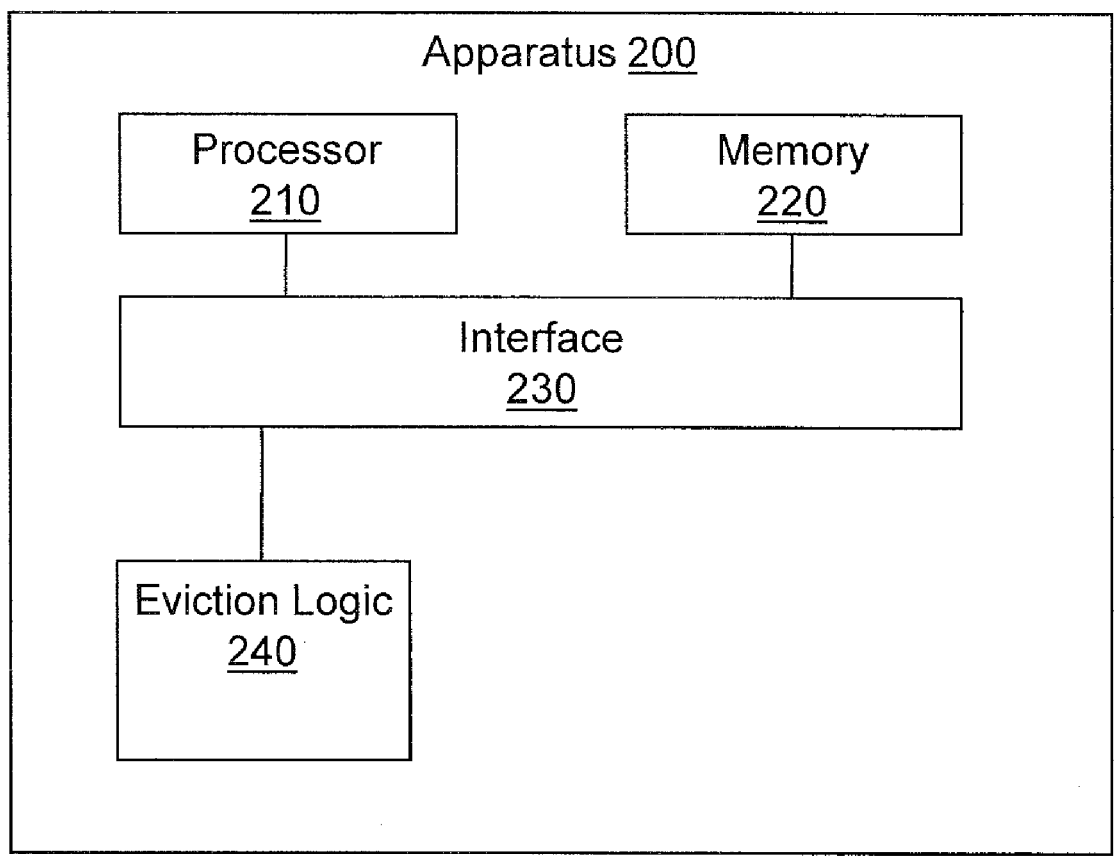
FIG. 2 illustrates an example system associated with index entry eviction.

FIG. 2 illustrates an apparatus 200. Apparatus 200 is configured to control hash bucket entry overflow situations. Apparatus 200 includes a processor 210, a memory 220, and an interface 230. The memory may store a hash bucket table that stores a portion of a data deduplication index. The data deduplication index may be stored on a data store that takes a longer time to access than the time it takes to access the first memory. The interface 230 connects the processor 210, the memory, 220, and an eviction logic 240. In different embodiments the eviction logic 240 may be, for example, a circuit, an integrated circuit, an application specific integrated circuit (ASIC), computer executable processes, or some other entity. The eviction logic 240 may provide a location of an entry in the bucket of the hash bucket table. The location may indicate that the entry is to be overwritten. The location may be provided as a function of a utility value associated with the entry, a time value associated with the entry, and a precedence value associated with the entry.

Figure 3:
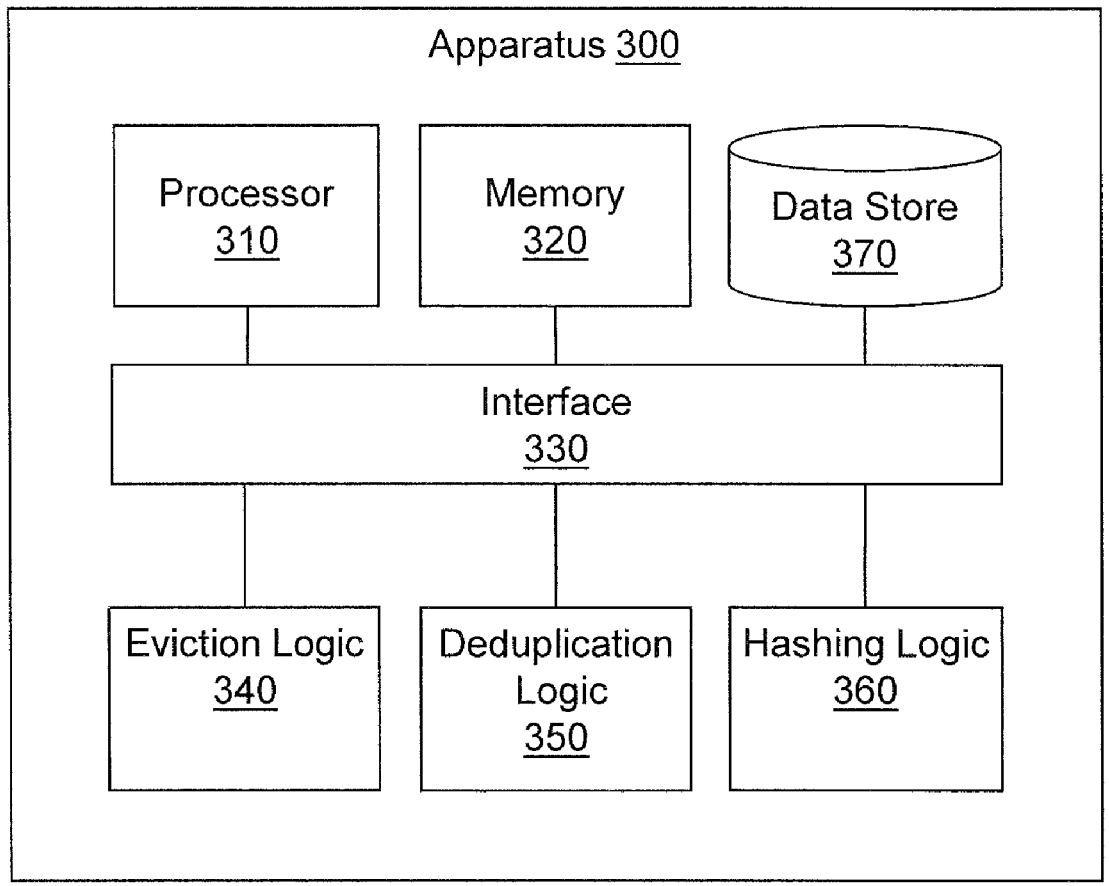
FIG. 3 illustrates an example system associated with index entry eviction.

FIG. 3 illustrates an apparatus 300. Apparatus includes several elements similar to those described in reference to apparatus 200 (FIG. 2). For example, apparatus 300 includes a processor 310, a memory 320 storing a hash bucket table, an eviction logic 340, and an interface 330 connecting the processor 310, the memory 320, eviction logic 340, and additional elements described below. For example, apparatus 300 includes the data store 370 that contains the data deduplication index.

Apparatus 300 also includes a deduplication logic 350. Deduplication logic 350 may search the hash bucket table in the memory 320 for an entry identified by a hash value. Deduplication logic 350 may control the eviction logic 340 to provide a location of an entry in the hash bucket table to be overwritten upon determining that the hash is not associated with an entry in the hash bucket table. In one example, the deduplication logic 350 may replace the entry in the hash bucket table with an entry associated with the hash value. The deduplication logic 350 may perform this replacement using the location received from the eviction logic 340. In one example, the deduplication logic 360 may selectively store the entry from the hash bucket table in a second memory before replacing the entry in the hash bucket with the entry associated with the hash value.

Apparatus 300 also includes a hashing logic 360. The hashing logic 360 may generate the hash value as a function of a block of data to be stored to a data store. This block of data may be stored to data store 370 in the case that the data deduplication index is stored on the same data store as data that the data deduplication index indexes. However, the block of data may be stored to an external data store or in a data store that is separate from data store 370.

By way of illustration, apparatus 300 may be a part of a system that handles backing up a computer's files. These files may be divided up in to several blocks, and though the files themselves may change, some of the blocks may remain unchanged between passes by the backup application. Files that are regularly backed up may change over time and thus apparatus 300 may speed up the backup process by helping limit memory writes to blocks of data that have recently changed. An index of hashes may help determine which blocks of data have already been backed up, and storing a portion of the index to RAM may speed up this determination for some of the most recent and most frequently used blocks of data.

In another example, the hash value may be generated as a function of a block of data on an external device. In this case, the apparatus 300 may selectively request the block of data from the external device upon determining whether a matching hash is found in the deduplication index. By way of illustration, if the hash is found in the index, this may mean that the block of data on the external device is already accessible to the apparatus and that it may be a waste of resources (e.g., time, bandwidth) for the block of data to be transmitted to the apparatus from the external device. On the other hand, if the hash is not found, the block of data may be requested from the external device. As described above, storing a portion of the index to RAM may speed up finding the hash. However, as RAM is typically a limited resource, apparatus 300 provides the ability to select entries to evict from the portion in RAM that are less likely to be requested again in the near future.

Figure 4:
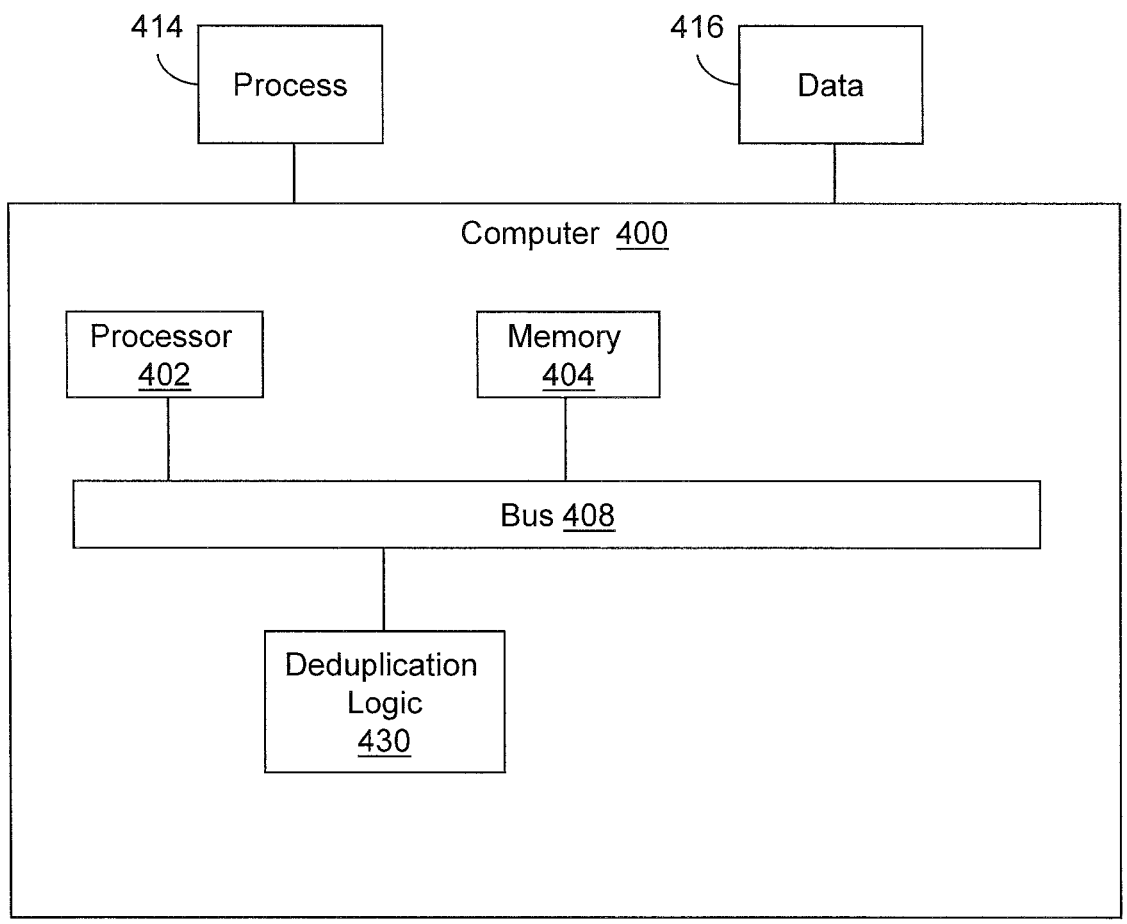
FIG. 4 illustrates an example computing environment in which example systems and methods, and equivalents, may operate.

FIG. 4 illustrates an example computing device in which example systems and methods described herein, and equivalents, may operate. The example computing device may be a computer 400 that includes a processor 402, and a memory 404, operably connected by a bus 408. In one example, the computer 400 may include a deduplication logic 430. In different examples, the logic 430 may be implemented in hardware, software in execution, firmware, and/or combinations thereof. While the logic 430 is illustrated as a hardware component attached to the bus 408, it is to be appreciated that in one example, the logic 430 could be implemented in the processor 402.

Thus, logic 430 may provide means (e.g., hardware, software in execution, firmware) for storing a portion of a data deduplication index in a hash bucket table. The means may be implemented, for example, as an ASIC. The means may also be implemented as computer executable instructions that are presented to computer 400 as data 416 that are temporarily stored in memory 404 and then executed by processor 402.

Logic 430 may also provide means (e.g., hardware, software in execution, firmware) for ranking entries in a bucket of the hash bucket table as a function of entry access times, entry utility values, and precedence values associated with entries. Logic 430 may also provide means (e.g., hardware, software in execution, firmware) for providing an identifier generated based on entry rankings. The identifier may comprise an entry location. The identifier may identify an entry at the entry location to be overwritten in the hash bucket table.

Generally describing an example configuration of the computer 400, the processor 402 may be a variety of various processors including dual microprocessor and other multi-processor architectures. A memory 404 may include volatile memory (e.g., a RAM) and/or non-volatile memory (e.g., a ROM).

The bus 408 may be a single internal bus interconnect architecture and/or another bus or mesh architecture. While a single bus is illustrated, it is to be appreciated that the computer 400 may communicate with various devices, logics, and peripherals using other busses (e.g., peripheral component interconnect express (PCIe), 1394, universal serial bus (USB), Ethernet). The bus 408 can be types including, for example, a memory bus, a memory controller, a peripheral bus, an external bus, a crossbar switch, and/or a local bus.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
   selecting a selected index entry for eviction from a bucket of index entries as a function of a time value, a utility value, and a precedence value, where an index entry in the bucket of index entries comprises a portion of a hash value, a memory location, and a utility value describing a usefulness of the index entry; and
   providing an index entry identifier that identifies the selected index entry,
   where the bucket of index entries is a bucket associated with a hash-bucket data structure that stores a portion of a data deduplication index,
   where the hash-bucket data structure is stored as an array in random access memory (RAM),
   where the array is divided into N buckets of size M, where N and M are integers,
   where a ranking value is generated for the index entry as a function of the time value and the precedence value when the index entry has not been accessed by an index lookup, where a ranking value is generated for the index entry as a function of the time value, the utility value, and the precedence value when the index entry has been accessed by an index lookup, and where index entries in the bucket of index entries are ranked according to ranking values.

2. The computer-readable medium of claim 1, where the utility value indicates a number of times the index entry has been used as a primary source of information for confirming the existence of data in a block of memory associated with the memory location.

3. The computer-readable medium of claim 1, where the time value indicates a time at which the index entry was recently accessed.

4. The computer-readable medium of claim 1, where the precedence value is a value generated as a function of the portion of the hash value.

5. The computer-readable medium of claim 4, where the precedence value is the numerical value of the portion of the hash value.

6. The computer-readable medium of claim 1, where an index entry having the lowest rank is designated the selected index entry.

7. The computer-readable medium of claim 1, where the index entry identifier controls a data deduplication logic to replace the selected index entry with a new index entry.

8. An apparatus, comprising:
   a processor;
   a first memory storing a hash bucket table that stores a portion of a data deduplication index; and
   an interface to connect the processor, the first memory, and a set of logics, the set of logics comprising:
   an eviction logic to provide a location of an entry in a bucket of the hash bucket table, where the location indicates that the entry is to be overwritten, where the location is provided as a function of a utility value associated with the entry, a time value associated with the entry, and a precedence value associated with the entry,
   where an entry in the hash bucket table comprises a portion of a hash value, a memory location, and a utility value describing a usefulness of the entry,
   where the hash bucket table is stored as an array in random access memory (RAM),
   where the array is divided into N buckets of size M, where N and M are integers, and
   where the eviction logic generates a ranking value for the entry in the hash bucket table as a function of the time value and the precedence value when the entry has not been accessed by an index lookup,
   where the eviction logic generates a ranking value for the entry in the hash bucket table as a function of the time value, the utility value, and the precedence value when the entry has been accessed by an index lookup, and
   where entries in the hash bucket table are ranked according to ranking values.

9. The apparatus of claim 8, where the data deduplication index is stored on data store that takes a longer time to access than the time it takes to access the first memory.

10. The apparatus of claim 9, comprising the data store.

11. The apparatus of claim 8, the set of logics comprising a deduplication logic to search the hash bucket table for a an entry identified by a hash value, and to control the eviction logic to provide a location of an entry in the hash bucket table to be overwritten upon determining that the hash is not associated with an entry in the hash bucket table.

12. The apparatus of claim 11, where the deduplication logic is to replace the entry with an entry associated with the hash value based on the location received from the eviction logic.

13. The apparatus of claim 11, the set of logics comprising a hashing logic to generate the hash value as a function of a block of data to be stored to a data store.

14. The apparatus of claim 11, where the hash value is generated as a function of a block of data on an external device, and where the apparatus selectively requests the block of data from the external device upon determining whether a matching hash is found in the deduplication index.

15. The apparatus of claim 12, where the deduplication logic is to selectively store the entry in the hash bucket table in a second memory before replacing the entry in the hash bucket table with the entry associated with the hash value.

* * * * *